United States Patent Office 3,043,194
Patented July 10, 1962

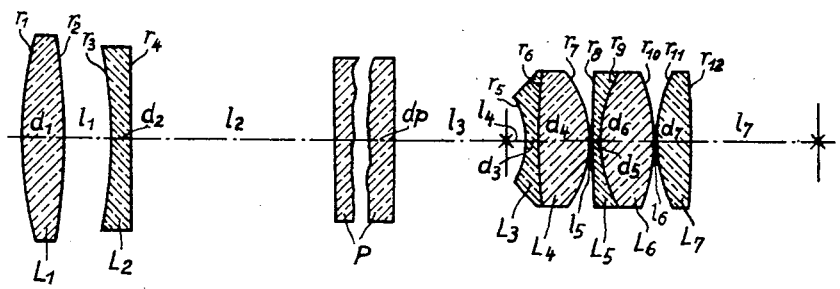

3,043,194
BINOCULARS
Horst Köhler, Heidenheim (Brenz), and Helmut Knutti, Oberkochen, Germany, assignors to Carl Zeiss, Wurttemberg, Germany
Filed Mar. 6, 1958, Ser. No. 719,691
Claims priority, application Germany Mar. 21, 1957
1 Claim. (Cl. 88—57)

It is a widely known disadvantage in the use of binoculars, quite particularly of the smaller handier types (e.g. 8×30, 6×30 etc.), that when used by a spectacle wearer they permit him at any time to survey only a fraction (about ¼ to ⅕) of the field of view he can see when using the binoculars without spectacles. This restriction of the field when a usual type of binocular is used by a spectacle wearer is caused by the following factors:

In binoculars of prior art, particularly in the aforesaid smaller types, the distance of the exit pupil from the last lens vertex of the eyepiece amounts as a rule to 10 mm. at most. The pupil of the human eye however, according to internationally agreed rules, is already 12 mm. distant from the rear vertex of the spectacle lens. If one adds to this the thickness of the spectacle lens amounting to several millimetres as well as the length occupied by the parts of the eyepiece mount, it becomes evident that the exit pupil of the binoculars of prior art is situated about 8 mm. in front of the eye pupil. The exit pupil of the instrument situated a considerable distance in front of the eye vignettes the field of view.

Attempts to improve this state of things have been made for a long time by letting the spectacle wearer attach lenses of his individual correction to the binocular whereupon he can observe without spectacles. While this procedure avoids the restriction of the field of view, it is so inconvenient that it is used only by few spectacle wearers. On the other hand, in certain special binoculars for military purposes such designs have been in use in which the distance of the exit pupil amounted to about 20 mm. They were known as "gas-mask eyepieces" since they were in the main intended for use with a gas-mask. In these last mentioned binoculars with "gas-mask eyepieces" the solution of the task has been to increase the focal lengths of both objective and eyepiece so far that in the eyepiece designs of prior art, in which the distance of the exit pupil from the last lens vertex is at most 80% of the focal length, the desired distance of 20 mm. results. This requires eyepieces of focal lengths from 25 to 30 mm. which in turn demands, with a magnification of 8×, objectives of focal lengths from 200 to 240 mm. This however results in dimensions which would render a binocular of approximately 30 mm. objective diameter much too unwieldly. Only for large binoculars, i.e. those with about 50 mm. objective diameter or more have the just described measures of prior art led to sensible designs.

The present invention is based on the problem of producing useful designs for the socalled minor binoculars i.e. those with a field of view of at least 50° which are fitted with objectives of a clear diameter less than 35 mm. and with eyepieces of a focal length of less than 20 mm., which are capable of reproducing as large a field of view as possible in observation through spectacles without the disadvantage of great overall length of the heretofore usual "gas-mask binoculars." The invention therefore is relative to binoculars having eyepieces in which the distance of the exit pupil from the last lens vertex on the side of the eye is greater than the focal length of the eyepiece but amounts to at least 14 mm.

Object of the present invention is a binocular of the specified type having three-component eyepieces, the first component located on the objective side being a divergent meniscus with its concave surface turned towards the objective side and being composed of two lenses of opposite refractive power the outer lens of which facing the objective side being a divergent lens of biconcave shape the radius of said concave surface turned towards the objective side being within the limits of 0.6 times and 1.0 times the focal length of the eyepiece, the cemented surface being convex towards the objective side and the thickness of said first component being greater than 0.5 times said focal length, the middle second component being a biconvex collective component composed of two lenses of opposite refractive power cemented together the lens facing the said first component being divergent and the cemented surface being convex towards the objective side and having a radius between 1.0 times and 2.0 times the said focal length and the convex outer surface on the eyeside of said middle second component being greater than 1.5 times but smaller than 3.0 times the said focal length, and the third component located on the eyeside being a single collective lens the absolute value of the radius of the outer surface facing the eyeside being greater than 3.0 times the said focal length.

With advantage the difference of the refractive indices at the cemented surfaces of the two cemented components is chosen greater than 0.1 wherein the dispersive lenses show the higher refractive index in each case.

In the attached FIGURE of the illustration an embodiment of a binocular according to the invention constructed according to the numerical values of the following table, with 8 times magnification, is represented. The numerical values refer to a focal length of the eyepiece of 100 units. The figures in brackets with the values for the objective are valid with reference to an objective focal length of 100 units.

In the table and on the drawing there designate:
L=the individual lenses,
r=the radii,
d=the lens thicknesses,
l=the air spaces,
$n_d$=the refractive indices, and
$\nu$=the Abbe numbers of the glass types.

The designations for the glass types are taken from

| Lenses | Radii | Thicknesses and Separations | $n_d$ | $\nu_d$ | Glass Types |
|---|---|---|---|---|---|
| $L_1$ | $r_1=+376.78$ (+47.316) | $d_1=42.583$ (5.348) | 1.6074 | 56.7 | SK2 |
|  | $r_2=-614.59$ (-77.180) | $l_1=45.422$ (5.704) |  |  |  |
| $L_2$ | $r_3=-435.10$ (-54.640) | $d_2=21.292$ (2.674) | 1.7174 | 29.5 | SF1 |
|  | $r_4=-7097.2$ (-891.27) | $l_2=202.27$ (25.401) |  |  |  |
| Prism Glass Path = |  | $dp=560.68$ (70.410) | 1.6200 | 36.3 | F2 |
|  |  | $l_3=110.01$ (13.815) |  |  |  |
|  |  | $l_4=20.227$ |  |  |  |
| $L_3$ | $r_5=-83.144$ | $d_3=11.356$ | 1.7552 | 27.5 | SF4 |
| $L_4$ | $r_6=+571.92$ | $d_4=52.520$ | 1.6204 | 60.3 | SK16 |
|  | $r_7=-106.189$ | $l_5=0.710$ |  |  |  |
| $L_5$ | $r_8=+960.18$ | $d_5=8.517$ | 1.7618 | 26.5 | SF14 |
| $L_6$ | $r_9=+126.21$ | $d_6=53.229$ | 1.6204 | 60.3 | SK16 |
|  | $r_{10}=-183.48$ | $l_6=0.710$ |  |  |  |
| $L_7$ | $r_{11}=+143.66$ | $d_7=35.486$ | 1.6074 | 56.7 | SK2 |
|  | $r_{12}=-757.81$ | $l_7=129.90$ |  |  |  | the catalogue "Jena glass for optics" L 1949, issued by the firm Jenaer Glaswerk Schott & Gen., Landshut (Bavaria).

We claim:

A binocular with a field of view of at least 50° fitted with objectives of a clear diameter less than 35 mm. and with eyepieces of a focal length less than 20 mm., said eyepieces having the distance of the exit pupil from the last lens vertex on the side of the eye greater than the focal length of the eyepiece and amounting to at least 14 mm., said eyepieces consisting of three components, the first component located on the objective side being a divergent meniscus with its concave surface turned towards the objective side and being composed of two lenses of opposite refractive power the outer lens of which facing the objective side being a divergent lens of biconcave shape, the radius of the said concave surface turned towards the objective side being within the limits of 0.6 times and 1.0 times the focal length of the eyepiece, the cemented surface being convex towards the objective side and the thickness of said first component being greater than 0.5 times said focal length, the middle second component being a biconvex collective component composed of two lenses of opposite refractive power cemented together the lens facing the said first component being divergent and the cemented surface being convex towards the objective side and having a radius between 1.0 times and 2.0 times the said focal length and the outer surface on the eyeside of said middle second component being greater than 1.5 times but smaller than 3.0 times the said focal length, and the third component located on the eyeside being a single collective lens the absolute value of the radius of the outer surface facing the eyeside being greater than 3.0 times the said focal length.

References Cited in the file of this patent

UNITED STATES PATENTS

| | | |
|---|---|---|
| 1,759,529 | Von Hofe | May 20, 1930 |
| 2,206,195 | Konig | July 2, 1940 |
| 2,419,151 | Miles | Apr. 15, 1947 |
| 2,441,036 | Schade | May 4, 1948 |
| 2,549,158 | Bertele | Apr. 17, 1951 |
| 2,814,969 | Kohler | Dec. 3, 1957 |

FOREIGN PATENTS

| | | |
|---|---|---|
| 546,450 | France | Aug. 23, 1922 |
| 679,047 | France | Jan. 5, 1930 |
| 492,174 | Germany | Feb. 11, 1930 |
| 691,946 | Germany | June 8, 1940 |
| 936,360 | Germany | Dec. 7, 1955 |
| 175,966 | Great Britain | Apr. 20, 1922 |
| 409,464 | Great Britain | May 3, 1934 |
| 53,230 | Netherlands | Oct. 15, 1942 |